(12) United States Patent
Kraus et al.

(10) Patent No.: US 10,214,065 B2
(45) Date of Patent: Feb. 26, 2019

(54) APPARATUS FOR TOE AND/OR CAMBER ADJUSTMENT FOR A RUNNING GEAR OF A MOTOR VEHICLE

(71) Applicant: Schaeffler Technologies AG & Co. KG, Herzogenaurach (DE)

(72) Inventors: Manfred Kraus, Herzogenaurach (DE); Harald Hochmuth, Hagenbuchach (DE); Jochen Rosenfeld, Erlangen (DE); Hartmut Krehmer, Erlangen (DE); Simon Mersmann, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 183 days.

(21) Appl. No.: 15/116,341

(22) PCT Filed: Dec. 5, 2014

(86) PCT No.: PCT/DE2014/200679
§ 371 (c)(1),
(2) Date: Aug. 3, 2016

(87) PCT Pub. No.: WO2015/113536
PCT Pub. Date: Aug. 6, 2015

(65) Prior Publication Data
US 2017/0008360 A1   Jan. 12, 2017

(30) Foreign Application Priority Data
Feb. 3, 2014   (DE) .......................... 10 2014 201 876

(51) Int. Cl.
*B60G 3/20*  (2006.01)
*B60G 7/00*  (2006.01)
*B62D 17/00* (2006.01)

(52) U.S. Cl.
CPC .............. *B60G 7/006* (2013.01); *B62D 17/00* (2013.01); *B60G 3/20* (2013.01); *B60G 2200/46* (2013.01);
(Continued)

(58) Field of Classification Search
CPC .... B60G 7/006; B60G 3/20; B60G 2200/462; B60G 2204/418; B60G 2202/42; B60G 2200/46; B60G 2200/4622; B62D 17/00
See application file for complete search history.

(56) References Cited

U.S. PATENT DOCUMENTS 4,726,603 A * 2/1988 Sugiyama ............ B60G 7/006
                                              280/5.522
6,386,553 B2 * 5/2002 Zetterstrom ............ B60G 3/20
                                              180/413
(Continued)

FOREIGN PATENT DOCUMENTS

DE    102010055060    6/2004
DE    102005052833    5/2007
(Continued)

Primary Examiner — Karen Beck
(74) Attorney, Agent, or Firm — Volpe and Koenig, P.C.

(57) ABSTRACT

An apparatus for toe and/or camber adjustment for a running gear of a motor vehicle, having a tie rod and/or a link which can be fastened at one side to a bearing fixed with respect to the car body and at the other side by a bearing can be fastened to the wheel carrier of a wheel of the motor vehicle, wherein one bearing has an adjustment element which is in the form of an eccentric and which has an eccentric shaft, which eccentric shaft can be adjusted by an adjustment drive and is assigned safety bearings arranged on both sides of the eccentric.

20 Claims, 2 Drawing Sheets

(52) U.S. Cl.
CPC ............... *B60G 2200/462* (2013.01); *B60G 2200/4622* (2013.01); *B60G 2202/42* (2013.01); *B60G 2204/418* (2013.01)

(56) References Cited

U.S. PATENT DOCUMENTS

| | | | | |
|---|---|---|---|---|
| 7,537,223 | B2* | 5/2009 | Zetterstroem | B60G 3/265 |
| | | | | 280/5.52 |
| 7,811,023 | B2* | 10/2010 | Marche | F16C 11/04 |
| | | | | 403/150 |
| 8,302,973 | B2* | 11/2012 | Lee | B60G 7/006 |
| | | | | 280/5.52 |
| 2007/0252350 | A1* | 11/2007 | van der Knapp | B60G 3/06 |
| | | | | 280/5.507 |
| 2010/0253026 | A1* | 10/2010 | Michel | B60G 3/26 |
| | | | | 280/86.751 |
| 2011/0135228 | A1* | 6/2011 | Kaneko | B60G 15/068 |
| | | | | 384/420 |
| 2011/0140378 | A1* | 6/2011 | Grau | B60G 21/0555 |
| | | | | 280/5.508 |
| 2013/0175776 | A1* | 7/2013 | Michel | B60G 7/006 |
| | | | | 280/86.751 |
| 2015/0078698 | A1* | 3/2015 | Capoldi | F16C 33/585 |
| | | | | 384/569 |
| 2016/0159190 | A1* | 6/2016 | Di Pace | B60G 17/016 |
| | | | | 701/36 |
| 2016/0377118 | A1* | 12/2016 | Schultz | F16F 1/40 |
| | | | | 384/221 |
| 2017/0008360 | A1* | 1/2017 | Kraus | B60G 7/006 |
| 2017/0210422 | A1* | 7/2017 | Schmid | B60G 7/006 |
| 2018/0170101 | A1* | 6/2018 | Asai | B60B 33/00 |

FOREIGN PATENT DOCUMENTS

| | | |
|---|---|---|
| EP | 0223256 | 5/1987 |
| EP | 2157008 | 2/2010 |
| EP | 2298581 | 3/2011 |
| EP | 2554408 | 2/2013 |
| JP | 2013075642 | 4/2013 |
| WO | 2008061619 | 5/2008 |

* cited by examiner

Prior Art

APPARATUS FOR TOE AND/OR CAMBER ADJUSTMENT FOR A RUNNING GEAR OF A MOTOR VEHICLE

FIELD OF THE INVENTION

The invention relates to an apparatus for toe and/or camber adjustment for a running gear of a motor vehicle, having a tie rod and/or a link that can be fastened or is fastened at one side to a bearing fixed with respect to the car body and at the other side by a bearing to the wheel carrier of a wheel of the motor vehicle, wherein a bearing has an adjustment element that is in the form of an eccentric and has an eccentric shaft that can be adjusted by an adjustment drive.

BACKGROUND

Apparatuses for running gears or wheel suspensions of motor vehicles are already known with which a toe and/or camber adjustment can be performed. Typically, a wheel of a vehicle is connected by a link (wheel link) and a tie rod to the vehicle body (chassis). The link or the tie rod is here usually attached on the wheel side by a bearing. The other end of the link or the tie rod can be connected by a bearing on the side of the car body to the chassis, to a component connected to the chassis, or to a steering gear. By adjusting the bearing position in the transverse direction of the vehicle, the toe or camber can be adjusted.

FIG. 1 shows a cutout of a conventional running gear, comprising a wheel carrier 13 to which a crossmember 14 is attached in an articulated way. The wheel carrier 13 is connected to a tie rod 15 that has an adjustment element constructed as an eccentric 16. The dashed lines 17 show the two positions between which the tie rod can be adjusted in order to influence a parameter of the running gear. The running gear shown in section in FIG. 1 comprises, in addition, a wheel link 18 is attached to the wheel carrier 13 in an articulated way.

In DE 10 2010 055 060 A1, an adjustment apparatus for toe or camber adjustment is disclosed. The apparatus comprises a bearing that contacts a bolt on the outside. The bolt is coupled, in turn, with eccentric plates that are supported on guide elements attached stationary on the chassis. By rotating the bolt connected to the eccentric plates, the bearing can be displaced perpendicular to the bearing axis.

In DE 10 2005 052 833 A1, an apparatus for adjusting a link of a wheel suspension is disclosed. The apparatus comprises an active eccentric bearing that can be rotated and thus adjusted by an electric adjustment motor. The eccentric shaft is supported in sliding bearings.

So that the high forced transmitted by the link to the eccentric shaft can also be received in extreme situations, the radial bearings must be dimensioned with comparatively large dimensions for supporting the eccentric shaft.

SUMMARY

The invention is based on the object of providing an apparatus for toe and/or camber adjustment, which is formed for receiving high forces and nevertheless has a small packaging space.

To achieve this objective in an apparatus of the type specified above, it is provided according to the invention that safety bearings arranged on both sides of the eccentric are allocated to the eccentric shaft.

The elastic safety bearings provided according to the invention come into operation only under high radial forces that are transmitted from the tie rod or the link to the eccentric shaft and the bearing fixed to the car body. The safety bearings are provided on both sides of the tie rod or the link on the eccentric shaft, so that the eccentric shaft is supported in the safety bearings. Because an overload of the bearing fixed to the car body is prevented, this bearing can have small dimensions accordingly, nevertheless all running gear forces are reliably received.

In the apparatus according to the invention, it is preferred that the safety bearings are constructed as sliding bearings that are suitable for receiving the high running gear forces that occur.

In the apparatus according to the invention it is preferred that the safety bearings are designed so that under normal loading they are not engaged although they are in contact. Accordingly, during normal operation the eccentric shaft is supported only by the bearing fixed to the car body, but not by the safety bearing.

With respect to the bearing fixed to the car body in the apparatus according to the invention, it is preferred that the eccentric shaft is supported in radial spring-mounted roller bearings.

In order to prevent damage to the eccentric shaft and the adjustment drive, it can be provided that, in the apparatus according to the invention, an overload coupling is arranged between the adjustment drive and the eccentric shaft. When a specified torque is reached on the eccentric shaft, the overload coupling is opened, whereby the connection to the adjustment drive and the eccentric shaft is decoupled. The decoupling is also used to protect the motor. In this way, damage, for example, in the form of deformation of the running gear link, is prevented. Preferably, the overload coupling automatically closes again as soon as the overload state no longer exists. The wheel position can be sensed by a sensor and then the toe and camber can be readjusted by the apparatus according to the invention.

The overload coupling of the apparatus according to the invention can have a spring element, preferably a spiral compression spring, wherein the spring element is supported on one side on the eccentric shaft and on the other side on the adjustment drive.

The adjustment drive of the apparatus according to the invention can be formed advantageously as an electric motor. Advantageously, the electric motor is connected to a transmission. Because the adjustment drive can be arranged directly on the eccentric shaft, the necessary packaging space is comparatively low.

In a vehicle, advantageously multiple such apparatuses according to the invention are provided, wherein an apparatus can be allocated to each tie rod or to each link. Through multiple such apparatuses that each have an adjustment drive as an actuator, an especially wheel-individual adjustment can be realized in comparison to the use of only one single adjuster.

BRIEF DESCRIPTION OF THE DRAWINGS

An embodiment of the invention is shown in the drawing and is described in more detail below. Shown are.

DETAILED DESCRIPTION OF THE PREFERRED EMBODIMENTS

Figure 1:
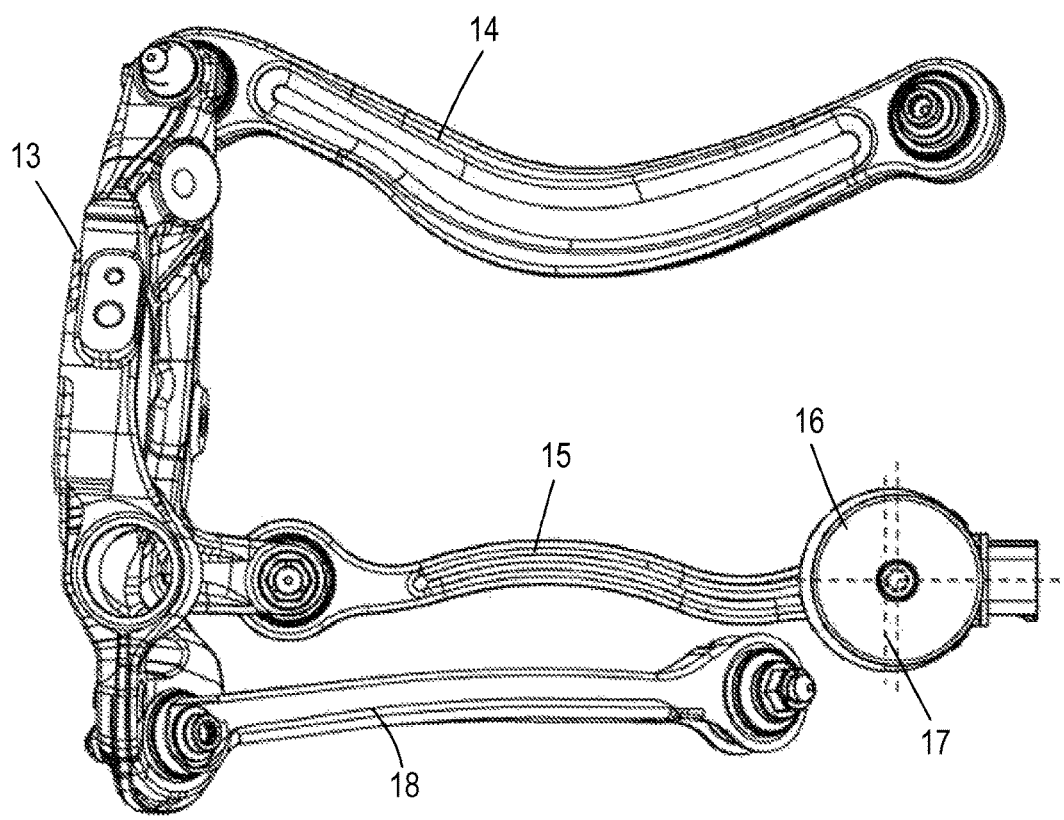
FIG. 1 components of a conventional running gear with an adjustment apparatus, and FIG. 2 an apparatus according to the invention for toe and/or camber adjustment for a motor vehicle.
Figure 2:
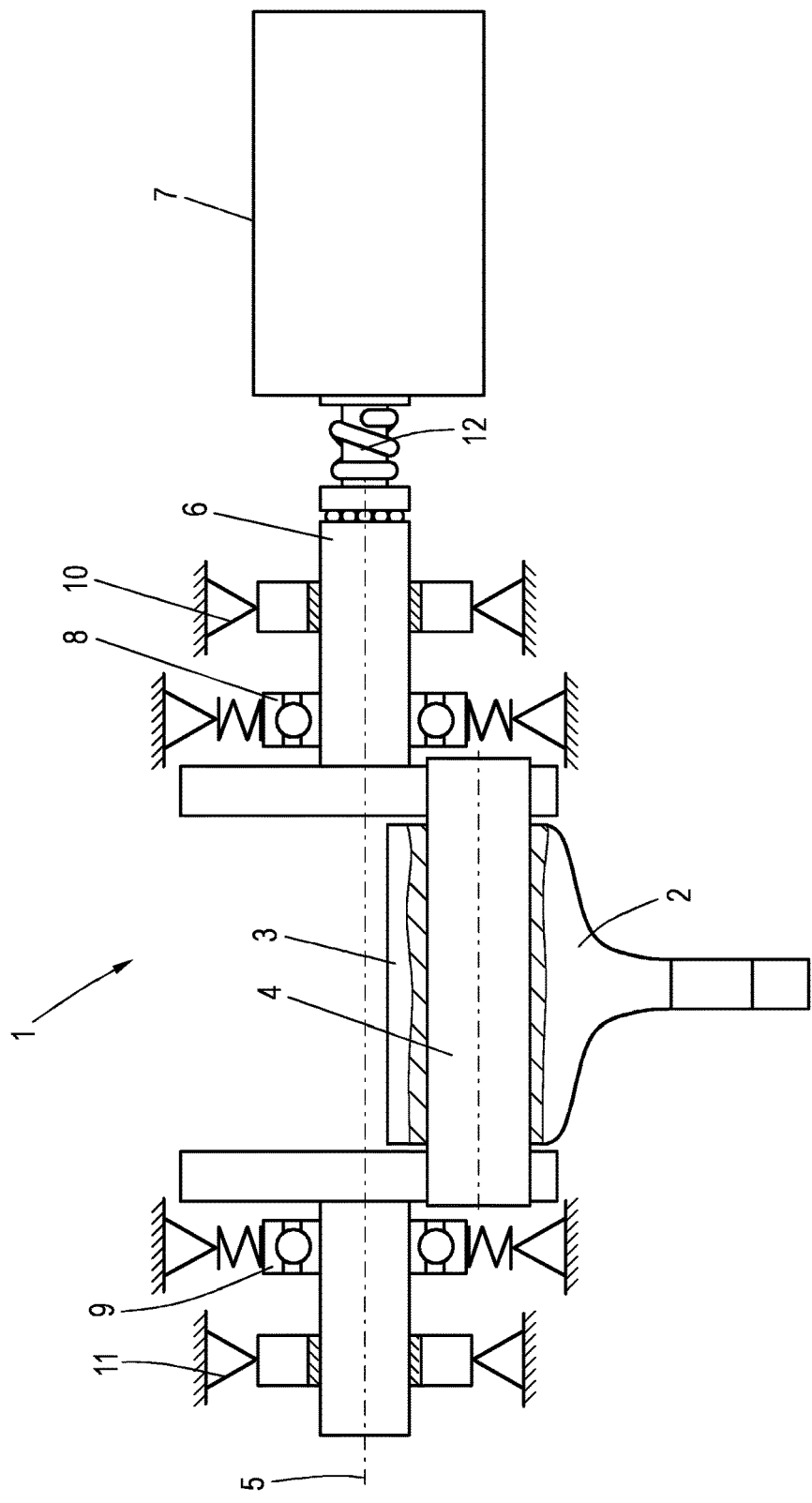

The apparatus 1 shown in FIG. 2 comprises a running gear link that is designated below as link 2. One end 3 of the link 2 is supported so that it can rotate on an eccentric shaft 4. The opposite end not shown in the drawing is attached on the wheel side by a bearing.

Reference symbol 5 indicates the rotational axis of the eccentric shaft 4. A shaft section 6 is coupled with an adjustment drive 7 constructed as an electric motor and having a transmission. The two-part shaft section 6 is supported in radial spring-mounted bearings 8, 9. In the shown embodiment, the bearings 8, 9 are roller bearings. In addition to each bearing 8, 9, there is a safety bearing 10, 11 that is designed so that the shaft sections 6 do not load the safety bearing 10, 11 during normal operation. Only when there is a large force that is transmitted via the link 2 or in other constructions via a tie rod to the eccentric shaft 4 do the safety bearings 10, 11 come into operation so that the shaft sections 6 are supported by the safety bearings 10, 11. The spring-mounted support of the bearings 8, 9 prevents the bearings 8, 9 from being damaged in the event of an elevated radial force.

Between the adjustment drive 7 and the shaft section 6 there is an overload coupling 12 that automatically decouples the adjustment drive 7 and the shaft section 6 when a specified limit for the torque is exceeded. As soon as the high torque is no longer active, the overload coupling 12 automatically closes again. The wheel position is then detected by a sensor and then the link 2 is set back into the desired position.

LIST OF REFERENCE NUMBERS

1 Apparatus
2 Link
3 End
4 Eccentric shaft
5 Rotational axis
6 Shaft section
7 Adjustment drive
8 Bearing
9 Bearing
10 Safety bearing
11 Safety bearing
12 Overload coupling
13 Wheel carrier
14 Crossmember
15 Tie rod
16 Eccentric
17 Lines
18 Wheel link

The invention claimed is:

1. An apparatus for at least one of toe or camber adjustment for a running gear of a motor vehicle, comprising at least one of a tie rod or a link that is fastenable at one side to a bearing fixed with respect to a car body and at another side by a bearing to a wheel carrier of a wheel of the motor vehicle, one of said bearings has an adjustment element including an eccentric and an eccentric shaft that is adjustable by an adjustment drive, and safety bearings arranged on both axial sides of the eccentric and axially away from the eccentric are allocated to the eccentric shaft, further comprising a pair of spring-mounted bearings each located axially between a respective one of the safety bearings and the eccentric.

2. The apparatus according to claim 1, wherein the safety bearings are formed as sliding bearings or rubber bearings.

3. An apparatus for at least one of toe or camber adjustment for a running gear of a motor vehicle, comprising at least one of a tie rod or a link that is fastenable at one side to a bearing fixed with respect to a car body and at another side by a bearing to a wheel carrier of a wheel of the motor vehicle, one of said bearings has an adjustment element including an eccentric and an eccentric shaft that is adjustable by an adjustment drive, and safety bearings arranged on both sides of the eccentric are allocated to the eccentric shaft, wherein the safety bearings are configured so that the safety bearings are not loaded during normal operation.

4. The apparatus according to claim 1, further comprising an overload coupling arranged between the adjustment drive and the eccentric shaft.

5. The apparatus according to claim 4, wherein the overload coupling has a spring element that is supported on one side on the eccentric shaft and on another side on the adjustment drive.

6. The apparatus according to claim 1, wherein the adjustment drive is comprises an electric motor.

7. The apparatus according to claim 6, wherein the electric motor is coupled with a transmission.

8. The apparatus according to claim 3, wherein the safety bearings are formed as sliding bearings or rubber bearings.

9. The apparatus according to claim 3, wherein the eccentric shaft is supported in radially spring-mounted roller bearings.

10. The apparatus according to claim 3, further comprising an overload coupling arranged between the adjustment drive and the eccentric shaft.

11. The apparatus according to claim 10, wherein the overload coupling has a spring element that is supported on one side on the eccentric shaft and on another side on the adjustment drive.

12. The apparatus according to claim 3, wherein the adjustment drive is comprises an electric motor.

13. The apparatus according to claim 12, wherein the electric motor is coupled with a transmission.

14. An apparatus for at least one of toe or camber adjustment for a running gear of a motor vehicle, comprising:
at least one of a tie rod or a link that is fastenable at one side to a bearing fixed with respect to a car body and at another side by a bearing to a wheel carrier of a wheel of the motor vehicle,
one of said bearings has an adjustment element including an eccentric and an eccentric shaft that is adjustable by an adjustment drive, and
safety bearings arranged on both axial sides of the eccentric and axially away from the eccentric are allocated to the eccentric shaft,
wherein the adjustment element includes a two-part split shaft extending along an axis of the eccentric shaft, and the two-part split shaft is located axially outside of the eccentric.

15. The apparatus according to claim 14, wherein the eccentric shaft is supported in radially spring-mounted roller bearings.

16. The apparatus according to claim 14, wherein the safety bearings are formed as sliding bearings or rubber bearings.

17. The apparatus according to claim 14, further comprising an overload coupling arranged between the adjustment drive and the eccentric shaft.

18. The apparatus according to claim 17, wherein the overload coupling has a spring element that is supported on one side on the eccentric shaft and on another side on the adjustment drive.

19. The apparatus according to claim 14, wherein the adjustment drive is comprises an electric motor.

20. The apparatus according to claim 19, wherein the electric motor is coupled with a transmission.

* * * * *